United States Patent [19]

Myers

[11] Patent Number: 4,515,266

[45] Date of Patent: May 7, 1985

[54] MODIFIED ATMOSPHERE PACKAGE AND PROCESS

[75] Inventor: Richard A. Myers, Dallas, Tex.

[73] Assignee: St. Regis Corporation, New York, N.Y.

[21] Appl. No.: 589,710

[22] Filed: Mar. 15, 1984

[51] Int. Cl.³ .................. B65D 81/20; B65D 85/34
[52] U.S. Cl. .................. 206/205; 206/525; 426/124; 426/419; 229/DIG. 14
[58] Field of Search .......... 206/205, 204, 525; 229/DIG. 14; 426/118, 124, 419, 415

[56] References Cited

U.S. PATENT DOCUMENTS

| | | | |
|---|---|---|---|
| 1,821,106 | 9/1931 | Milani | 426/419 |
| 2,452,174 | 10/1948 | Arnold | 229/DIG. 14 |
| 3,450,542 | 6/1969 | Badran | 426/124 |
| 3,507,667 | 4/1970 | Magnen | 206/525 |
| 3,521,806 | 7/1970 | Esty | 206/205 |
| 3,706,410 | 12/1972 | Baker | 206/205 |
| 3,761,289 | 9/1973 | Wolf | 206/205 |
| 4,411,918 | 10/1983 | Cimino | 426/419 |

Primary Examiner—William T. Dixson, Jr.
Attorney, Agent, or Firm—Joseph M. Maguire

[57] ABSTRACT

A package for preserving produce in a wholesome condition for an extended period of time is formed by a sealed container enveloping the produce and filled with a preservative gas which inhibits bacterial growth. The container is formed by a high barrier film which is so perforated as to provide a gas pressure within the container sufficient to inhibit air inflow into the container and to assure gas outflow from the container to prevent its distortion.

6 Claims, 5 Drawing Figures

MODIFIED ATMOSPHERE PACKAGE AND PROCESS

BACKGROUND OF THE INVENTION

This invention relates in general to a container for and a method of preserving produce in a wholesome condition for an extended period of time.

A large variety of fruits and vegetables are characterized by relatively short shelf lives in the ripened condition. All fresh produce respires after harvest. The largest gas component of this respiration is carbon dioxide. Significant ethylene is also generated which has a catalytic effect on accelerating ripening rate. It is known that shelf life of perishable produce can be lengthened by preserving them in inert gas filled containers. Oxygen, the all-important life giving element, possesses such unfortunate properties as supporting the growth of bacteria which cause food deterioration and discoloration. Improvement in produce shelf life can be gained by reducing oxygen available for conversion to carbon dioxide, reducing ethylene levels to slow catalytic effects, and maintaining a higher than atmosphere level of carbon dioxide to reduce bacteriological growth. Also, the replacement of oxygen by an inert atmosphere, such as nitrogen, argon or helium inhibits bacterial growth, assuring longer shelf life and retention of flavor and color.

Modified atmosphere containers of the type indicated have been mostly in the form of storage rooms and portable container vans having systems for continuously monitoring and changing the atmosphere to reduce or eliminate oxygen or other gases which affect ripening of produce.

Individual modified atmosphere containers have been tried wherein a sealed container occupied by produce is formed by a high barrier film and filled with a mixture of nitrogen and/or carbon dioxide. One difficulty experienced with such a container is that produce respiration and bacterial action causes gases and volatiles to build up inside the container, resulting in a continuing increase in pressure which eventually produces bulging and even rupture of the container.

SUMMARY OF THE INVENTION

The general object of the present invention is the provision of a package for and a method of preserving produce in a wholesome condition for an extended period of time by an improved application of modified atmosphere packaging.

In accordance with the invention, the package comprises a container enveloping the produce, filled with a gas which inhibits bacterial growth, and formed by a high barrier film which is so perforated as to provide a gas pressure within the container sufficient to inhibit air inflow into the container and to assure gas outflow from the container at a rate such as to prevent its distortion and/or rupture. This mode of packaging prevents internal pressure buildup which could cause transport and storage difficulties due to change in package shapes; vents excess carbon dioxide which could adversely affect the taste of the produce; permits easy adjustment of the size, quantity and location of perforations to satisfy the respiration rate of the produce to be packaged; and provides a significant improvement in the shelf life of the produce.

DESCRIPTION OF THE PREFERRED EMBODIMENT

Figure 1:
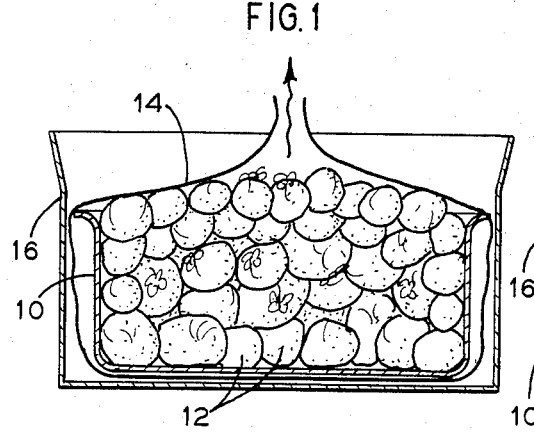
FIGS. 1-3 are schematic perspective views of a device in which trays of fruit are packaged in accordance with the invention.
Figure 2:
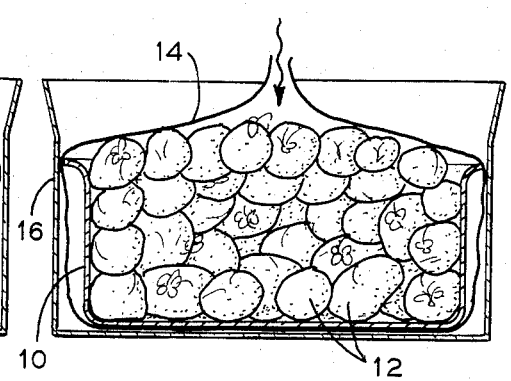
Figure 3:
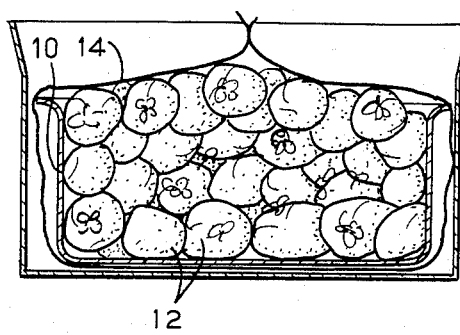
Figure 4:
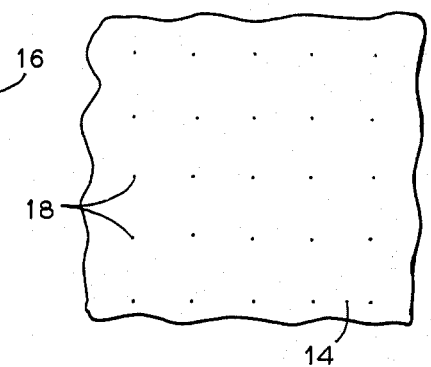
FIG. 4 shows a portion of the container film after it is perforated.

In accordance with the invention, a tray 10 containing produce 12, such as strawberries, is placed into a bag or container 14 formed by a high barrier film. High barrier film is defined as a comparatively gas impermeable film having a permeability to $O_2$ less than 1.0 cc, to $CO_2$ less than 5.0 cc, and to $N_2$ less than 1.0 cc, each per mil per 100 square inches per 24 hours at STP (0° C., 760 mm Hg). The bag is then moved to a machine 16 of known construction where air is evacuated from the bag, as shown by the arrow in FIG. 1, and replaced with a gas, as indicated by the arrow in FIG. 2, which inhibits bacterial growth to provide longer shelf life and retention of flavor and color. Then the gas-filled bag is heat or otherwise sealed in a conventional manner, as shown in FIG. 3, followed by perforating of the bag to provide perforations 18, as shown in FIG. 4.

The preservative gas may be nitrogen, argon, helium, carbon dioxide or mixtures thereof. If the produce is fruit and depending on the type of fruit, various levels of carbon dioxide are desirable to retard bacterial action, but excessive levels and/or lesser levels of carbon dioxide under relatively high pressure are undesirable since these conditions quickly affect taste.

The packaging film should be selected from gas impermeable material such as polyvinyl alcohol ethylene vinyl alcohol, polyvinylidene chloride or a combination of these materials with each other or in further combination with polyethylene, ethyl vinyl acetate copolymer, ionomer, or coextrusions of two or more of the aforementioned polymeric materials.

The size and number of film perforations 18 should be determined by the nature of the produce being packaged and should be such as to provide a cross-sectional area for gas flow of the order that will yield a positive gas pressure within the container, owing to the preservative gases and the gases generated by respiration of the produce, sufficient to inhibit air inflow into the container and to assure gas outflow from the container to prevent its bulging or bursting. While the container can tolerate an internal pressure of up to 200 millibars above ambient without rupturing, a few millibars above ambient is the preferred level. Thus the cross sectional area of perforations 18 for gas flow is proper when the gases in the container continue to cause a very slight flow out of the container and overcome any significant diffusion of oxygen from the atmosphere into the container. The perforations can be formed in the film of the container either before or after the packaging of the produce.

In application of the invention, trays containing strawberries were placed into separate containers each formed by a high barrier film, some bags being perforated in accordance with the invention and the remainder having no perforations. Each bag had its air removed and replaced with nitrogen, followed by heat sealing of the container. The unperforated containers expanded over a period of time, their expansion being a function of ambient temperature, due to gases generated by the strawberries. Eventually, most of the unperforated containers burst or had major seal failures, while the perforated containers had no bulging or seal failures. Shelf-life of the strawberries was significantly increased in the perforated containers compared to the unperforated containers, five weeks versus one week when the containers were refrigerated and seven days versus 36 hours when the containers were unrefrigerated.

Figure 5:
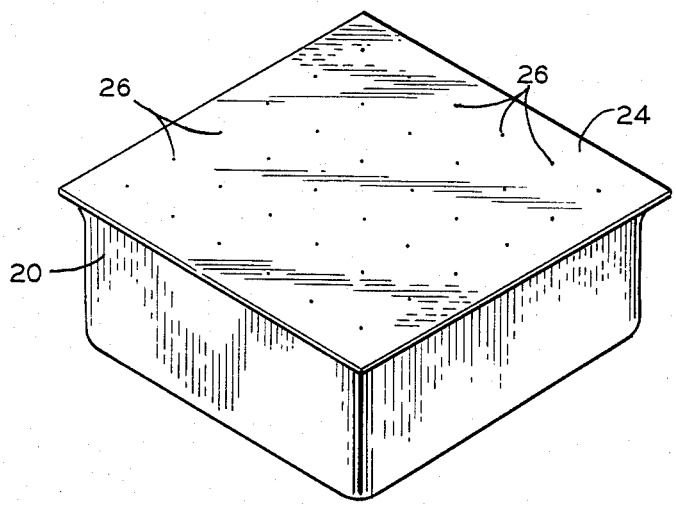
FIG. 5 is a perspective view of a modified package embodying the invention.

In a second application of the invention, thermoformed high barrier trays 20 containing nectarines were surrounded by a chamber for removal of air from the trays under a vacuum of about 29 inches of water, followed by introduction of nitogren into the trays, closing of the top of the trays by heat sealing a high barrier film 24 onto each tray, and then removing the chamber. The unperforated trays expanded over a period of time due to gases generated by the nectarines. Eventually, some of the containers burst or the fruit became very unpleasant in taste due to high retained carbon dioxide. Another set of nectarine trays were subjected to the procedure described above except that the top film 24 was perforated with perforations 26 in accordance with the invention and as shown in FIG. 5. The perforated trays had no bulging or seal failures. Also, shelf life of the perforated trays was significantly increased compared to the unperforated trays, the nectarines still having good taste and aroma.

I claim:

1. A method for preserving produce which comprises placing the produce in a container formed by a high barrier film, removing the air from the container and replacing it with a preservative gas which inhibits bacterial growth, sealing the container, and perforating the film to provide a gas pressure within the container sufficient to inhibit air inflow into the container and to assure gas outflow from the container to prevent its distortion.

2. The method of claim 1, wherein the preservative gas is nitrogen, argon, helium or mixtures thereof with each other or with carbon dioxide.

3. The method of claim 2, wherein the film is so perforated as to provide a slightly positive gas pressure within the container.

4. A package for preserving produce in a wholesome condition for an extended period of time which comprises a sealed container enveloping the produce, filled with a preservative gas which inhibits bacterial growth, and formed by a high barrier film which is so perforated as to provide a gas pressure within the container sufficient to inhibit air inflow into the container and to assure gas outflow from the container to prevent its distortion.

5. The package of claim 4, wherein the preservative gas is nitrogen, argon, helium or mixtures thereof with each other or with carbon dioxide.

6. The package of claim 5, wherein the film is so perforated as to provide a slightly positive gas pressure within the container.

* * * * *